(12) United States Patent
Meteoglu et al.

(10) Patent No.: US 9,241,350 B1
(45) Date of Patent: Jan. 19, 2016

(54) ACCESS NETWORK TYPE IDENTIFICATION IN MOBILE INTERNET PROTOCOL (MIP) REGISTRATION (RRQ)

(71) Applicant: Sprint Communications Company L.P., Overland Park, KS (US)

(72) Inventors: Emel Meteoglu, San Mateo, CA (US); Kosol Jintaseranee, Millbrae, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 116 days.

(21) Appl. No.: 13/968,629

(22) Filed: Aug. 16, 2013

(51) Int. Cl.
*H04W 80/04* (2009.01)
*H04W 88/06* (2009.01)
*H04W 28/04* (2009.01)
*H04W 72/04* (2009.01)
*H04W 76/00* (2009.01)

(52) U.S. Cl.
CPC ..................................... *H04W 76/00* (2013.01)

(58) Field of Classification Search
CPC ....... H04W 8/04; H04W 88/06; H04W 28/04; H04W 72/04; H04W 36/18
USPC .......................................... 370/328, 329, 331
See application file for complete search history.

(56) References Cited

U.S. PATENT DOCUMENTS

| | | | |
|---|---|---|---|
| 7,443,824 B1 | 10/2008 | Lipford et al. | |
| 7,693,534 B1* | 4/2010 | Lundy et al. | 455/518 |
| 7,944,887 B1* | 5/2011 | Breau et al. | 370/331 |
| 8,457,070 B2* | 6/2013 | Park et al. | 370/331 |
| 2004/0103282 A1* | 5/2004 | Meier et al. | 713/171 |
| 2004/0248574 A1* | 12/2004 | Watanabe et al. | 455/435.1 |
| 2005/0047399 A1* | 3/2005 | Lee et al. | 370/352 |
| 2005/0185617 A1* | 8/2005 | Chaudry et al. | 370/331 |
| 2005/0213566 A1* | 9/2005 | Jutila et al. | 370/352 |
| 2006/0073840 A1* | 4/2006 | Akgun et al. | 455/456.3 |
| 2011/0171915 A1* | 7/2011 | Gomes et al. | 455/73 |
| 2013/0022043 A1* | 1/2013 | Lee | 370/389 |
| 2013/0072184 A1* | 3/2013 | Kusano et al. | 455/423 |
| 2013/0170412 A1* | 7/2013 | Patterson et al. | 370/310 |

* cited by examiner

Primary Examiner — Ronald B Abelson

(57) ABSTRACT

A wireless communication device identifies the access network type in the Mobile IP (MIP) Registration Request (RRQ). The wireless communication device uses a wireless communication network to access the IP communication network. The wireless communication device initiates a switch to another wireless communication network. In response to initiating the switch, the wireless communication device determines the network type of the new wireless communication network and generates a MIP RRQ identifying the access network type. After the MIP Registration Response (RRP) is received, the wireless communication device sends and retrieves IP data with the IP communication network via the new wireless communication network.

18 Claims, 8 Drawing Sheets

ND TYPE IDENTIFICATION
ACCESS NETWORK TYPE IDENTIFICATION IN MOBILE INTERNET PROTOCOL (MIP) REGISTRATION (RRQ)

TECHNICAL BACKGROUND

Wireless communication devices communicate with wireless communication networks using wireless protocols, such as Long Term Evolution (LTE), Evolution Data Optimized (EVDO), Code Division Multiple Access (CDMA), Global System for Mobile communications (GSM), High Speed Packet Access (HSPA), and the like. Additionally, wireless communication devices are increasingly being used to send and retrieve data over Internet Protocol (IP) networks. The IP networks use IP addresses to route packets to their destinations.

With the advances in mobile technology, wireless communication devices continue to advance in available services. Users of wireless communication devices may be mobile and require continuous and uninterrupted service. For example, during a Voice over IP (VoIP) call, video conference, or other data streaming session, it is important to maintain a continuous uninterrupted connection to the IP network. As a wireless communication device travels through the communication system, it may change its point of attachment and the wireless communication device may receive a new IP address. Without dynamic addressing and routing, every time a node acquires a new IP address, all connections that were open with the previous IP address have to be shutdown or terminated and then re-initiated with the new IP address. Depending on the operating system, this may require a complete reboot of the machine.

Mobile IP (MIP) allows packets to be properly routed when a wireless communication device is not connected to its home network. In other words, Mobile IP allows a wireless communication device to maintain IP communications regardless of its point attachment or current IP address. The change in point of attachment may be a result of a change in the wireless communication device's physical location, which necessitates a change in the wireless communication device's IP address. Although the change in the wireless communication device's IP address may be caused by other factors.

TECHNICAL OVERVIEW

A wireless communication device identifies the access network type in the Mobile IP (MIP) Registration Request (RRQ). The wireless communication device uses a wireless communication network to access the IP network. During an active data session, the wireless communication device initiates a switch to another wireless communication network. In response to initiating the switch, the wireless communication device determines the network type of the new wireless communication network and generates a MIP RRQ identifying the network type of the new wireless communication network. After the MIP Registration Response (RRP) is received, the wireless communication device sends and retrieves IP data with the IP communication network via the new wireless communication network.

DETAILED DESCRIPTION

Figure 1A:
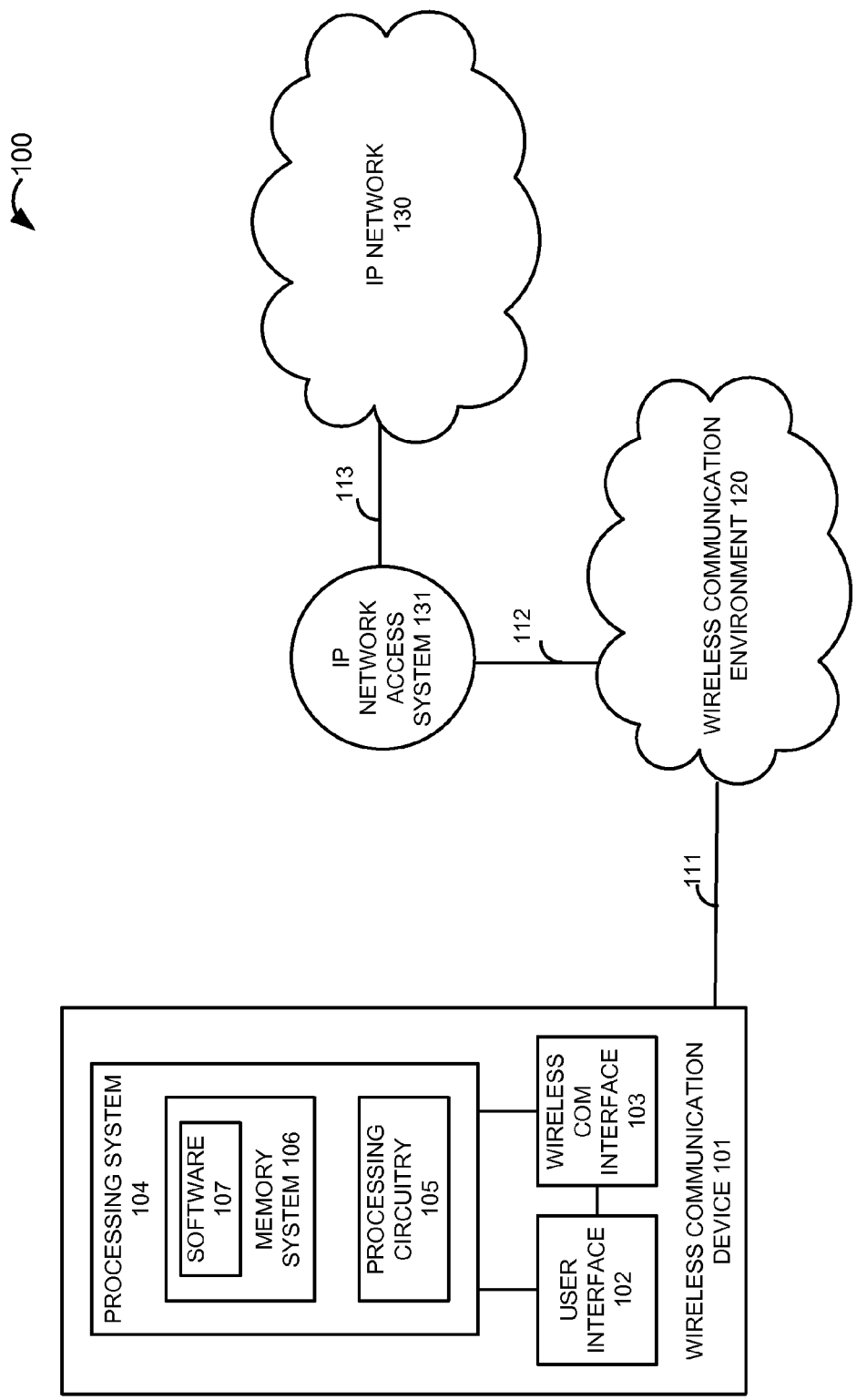
FIG. 1A illustrates a communication system to identify network access types in MIP RRQs.

FIG. 1A illustrates a communication system to identify network access types in MIP RRQs. Communication system 100 comprises: wireless communication device 101, wireless communication environment 120, IP access system 131, IP network 130, and communication links 111-113. Wireless communication device 101 includes user interface 102, wireless communication interface 103, and processing system 104. Processing system 104 includes processing circuitry 105 and memory system 106. Memory system 106 stores software 107.

Figure 1B:
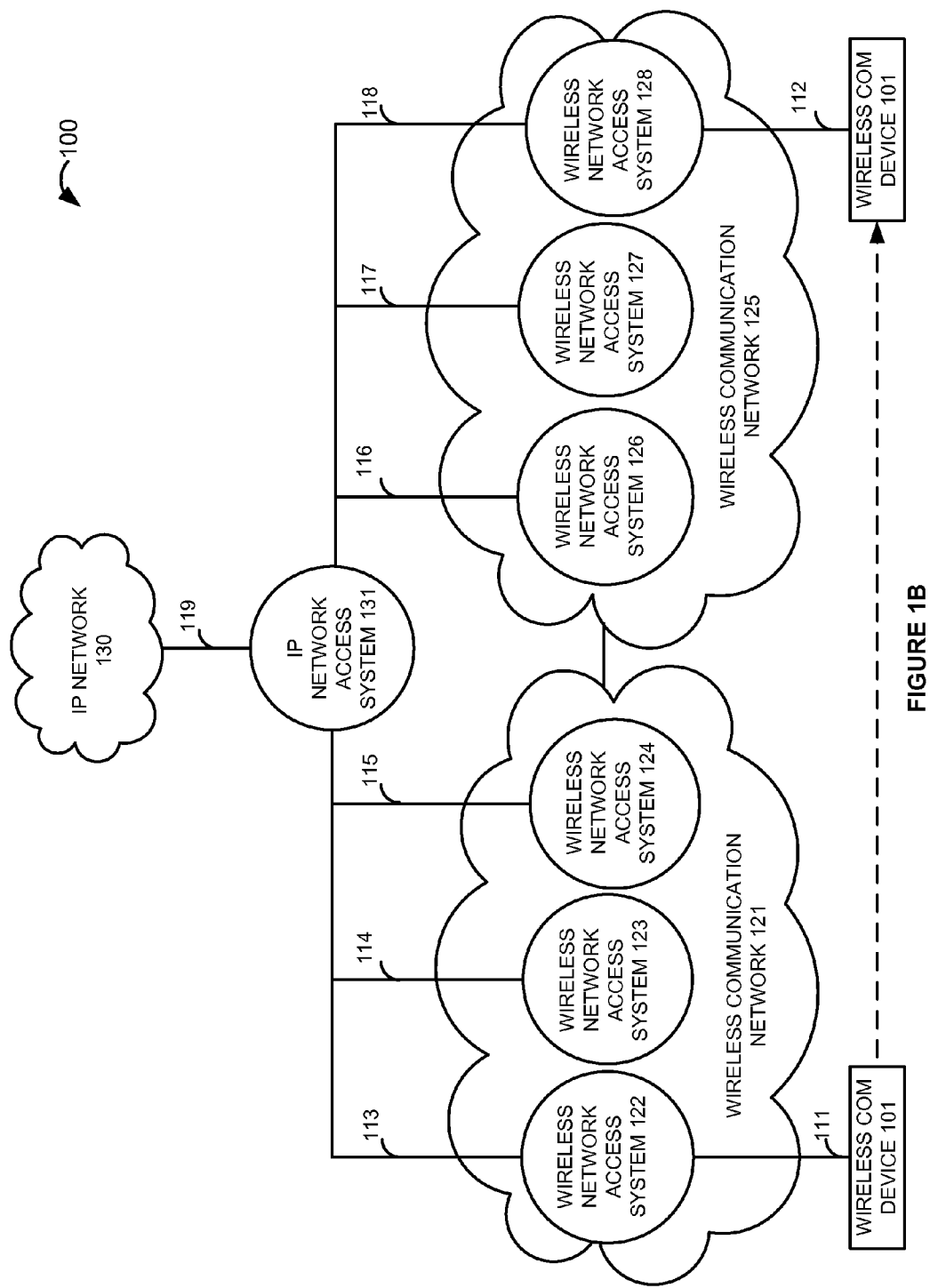
FIG. 1B illustrates the communication system to identify network access types in MIP RRQs.

FIG. 1B is a depiction of communication system 100 in FIG. 1A. Communication system 100 comprises: wireless communication device 101, wireless communication networks 121 and 125, IP access system 131, IP network 130, and communication links 111-119. Wireless communication network 121 includes wireless network access systems 122-124. Wireless communication network 125 includes wireless network access system 126-128.

Wireless communication device 101 sends and retrieves IP data with IP network 130 via wireless communication network 121. Examples of IP data include voice, music, games, or some other type of IP content. Wireless communication network 125, although shown in FIG. 1B, is optional. In response to initiating a switch from wireless communication network 121 to wireless communication network 125 wireless communication device 101 generates a Mobile IP (MIP) Registration Request (RRQ) identifying wireless access system 128. Wireless communication device 101 then wirelessly transfers for delivery to IP access system 131 the MIP RRQ.

Figure 2:
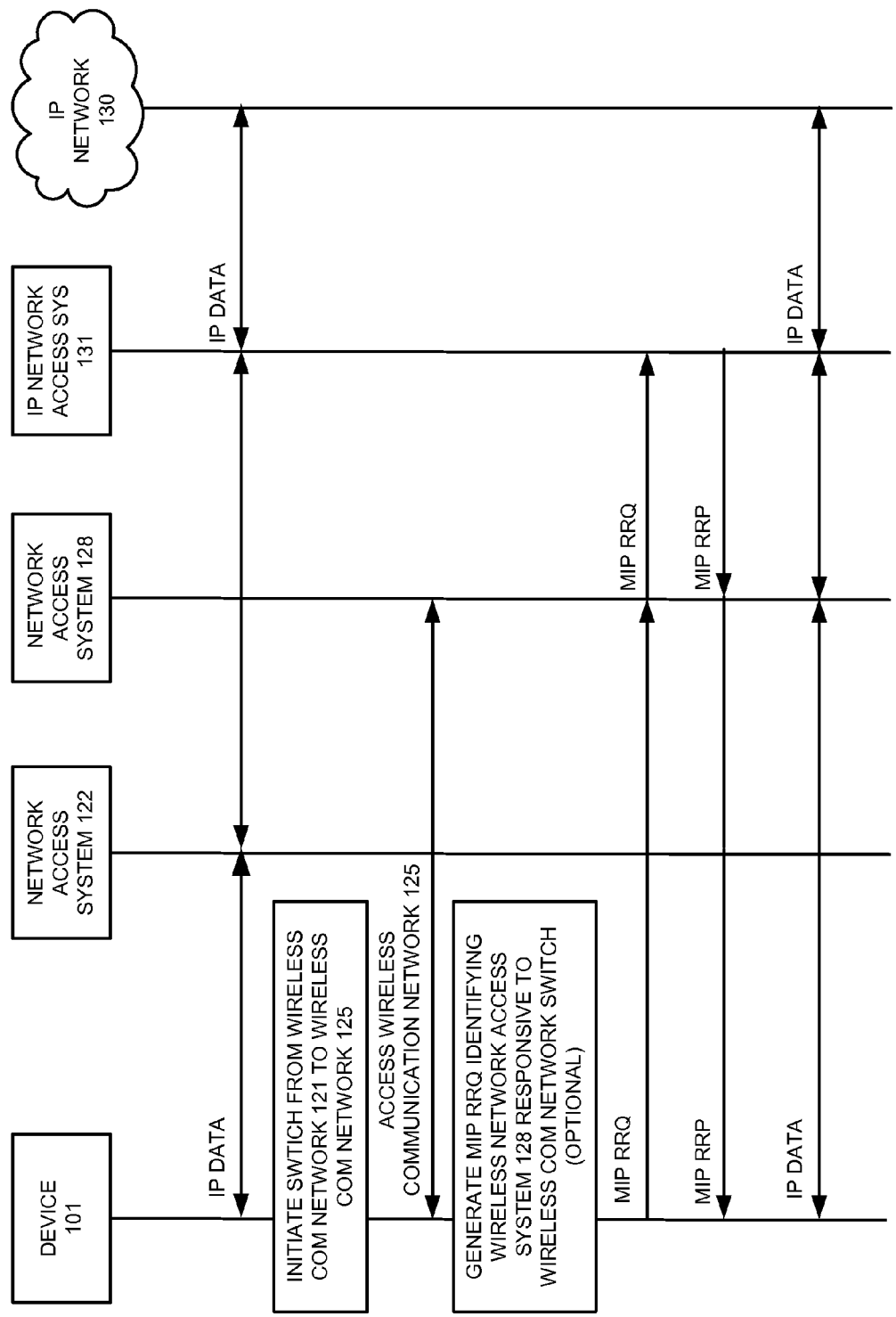
FIG. 2 illustrates the operation of the communication system to identify network access types in MIP RRQs.

FIG. 2 illustrates the operation of communication system 100 to identify network access types in MIP RRQs. Wireless communication device 101 exchanges IP data with IP network 130 via network access system 122 in wireless communication network 121. Wireless communication network 121 could be a wide area network (WAN), a local area network (LAN), cellular network, enterprise network, or some other wireless communication system that provides wireless access to IP network 130.

During the exchange of IP data wireless communication device 101 initiates a switch from wireless communication network 121 to wireless communication network 125. In response to initiating the switch between wireless communication network 121 and wireless communication network 125, wireless communication device 101 generates a MIP RRQ identifying wireless access system 128. The switch between wireless communication network 121 and wireless communication network 125 could be initiated in response to wireless communication device 101 losing communication to wireless communication network 121 or wireless communication device 101 leaving radio coverage of wireless communication network 121, among other reasons.

After being authenticated and authorized, wireless communication device 101 receives a MIP Registration Response (RRP). Wireless communication device 101 now exchanges IP data with IP network 130 via wireless access system 128 in wireless communication network 125.

Figure 3:
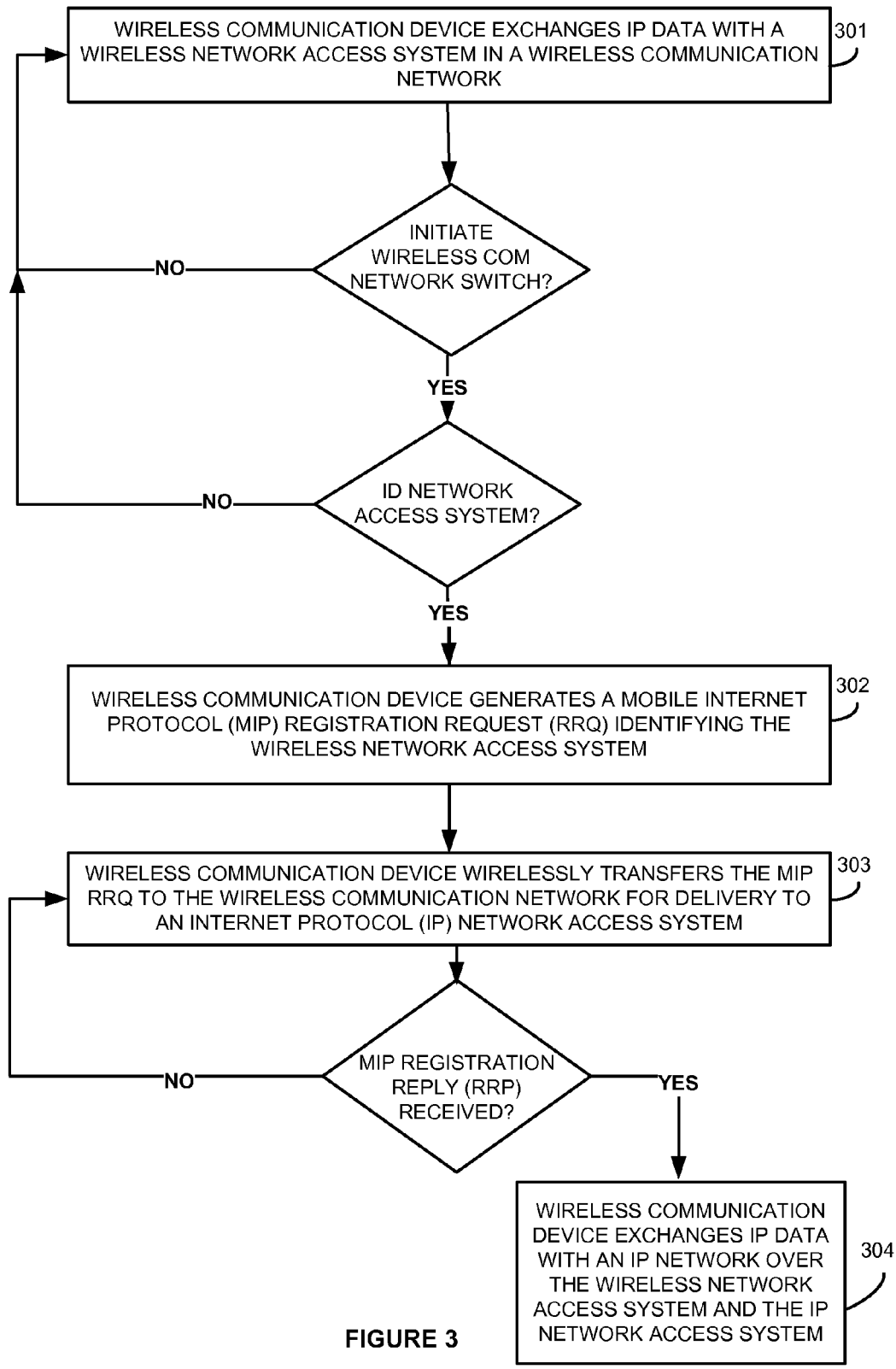
FIG. 3 illustrates the operation of the communication system to identify network access types in MIP RRQs.

FIG. 3 illustrates the operation of communication system 100 to identify network access types in MIP RRQs. Wireless communication device 101 exchanges IP data with IP network 130 through wireless access system 122 in wireless communication network 121 (301). Wireless communication device 101 may have one or multiple active data sessions open at any given time. Examples of data sessions include: video conferencing, Voice over IP (VoIP) calls, video chat, media streaming, downloading/syncing, payment processing, or some other data session where IP data is exchanged with an IP network. The IP data may comprise voice, video, image, music, game, or other IP data. Wireless communication networks 121 and 125 may use various protocols, such as LTE, EVDO, CDMA, GSM, HSPA, Wireless Fidelity (WIFI), WiMax, or some other wireless communication protocol.

Wireless communication device 101 initiates a switch from wireless communication network 121 to wireless communication network 125. The switch between wireless communication networks may be in response to the wireless communication device 101 moving within wireless communication environment 120.

In response to initiating the switch, wireless communication device 101 generates a MIP RRQ identifying wireless network access system 128 (302). The generated MIP RRQ identifies the network type wireless communication device 101 is moving to and/or from. For example, if wireless communication device 101 is switching to a WIFI network, the MIP RRQ may include Service Set Identifier (SSID), Received Signal Strength Indicator (RSSI), Received Channel Power Indicator (RCPI), and/or Basic Service Set (BSS) information. In another example, if wireless communication device 101 is roaming the MIP RRQ may include System Identification (SID), Network Identification (NID), cell sector ID, and/or latitude and longitude information of the roaming network.

The identification of wireless network access system 128 could also include identifying: the Network Access Identifier (NAI), type of wireless communication network, the specific wireless network access system, the location of the wireless network access system, among other information about the wireless network access system—including combinations thereof.

It may be desirable and/or advantageous for communication system 100 to track, monitor, and/or analyze NAI and access network type combinations in order to monitor locations of frequent handovers between wireless communication networks. In other examples, communication system 100 may monitor the time between cross network handoffs. Additionally, network type information may be used to select access networks.

Wireless communication device 101 populates different fields in the MIP RRQ to identify the access network type. Wireless communication device 101 may populate existing fields in the MIP RRQ or may generate a new field or fields. The field populated depends on the wireless protocol of the wireless communication network. For example: (1) LTE, populate the Physical Cell Identification (PCI); (2) EVDO, populate the Base Station Identification (BSID); (3) GSM, populate the Base Station Identity Code (BSIC); (4) CDMA, populate the Mobile Switching Center Identification (MSCID); and (5) WIFI, populate the Basic Service Set Identification (BSSID). Wireless communication device 101 wirelessly transfers the MIP RRQ to wireless communication network 125 for delivery to IP network access system 131 (303). Some examples of IP network access system 131 are a PDN Gateway (P-GW), a Home Agent, or a Wireless Access Gateway (WAG).

When wireless communication device 101 has been authenticated and authorized, a MIP Registration Response will be transferred to wireless communication device 101. Then wireless communication device 101 will exchange IP data with IP network 130 over wireless network access system 128 in wireless communication network 125 (304).

Consider the example where the user of a wireless communication device is working in the local coffee shop, which offers free WIFI. While in the coffee shop, the user starts a video conference session on the wireless communication device over the WIFI and IP network. While the video conference session is still in progress, the user leaves the coffee shop and the WIFI coverage area, causing the wireless communication device to transition to the LTE communication network to access the IP network. The wireless communication device would generate a MIP RRQ identifying the eNode B used to access the LTE communication network. Specifically, the wireless communication device would populate the Physical Cell Identification (PCI) field in the MIP RRQ.

In another example, the user of a wireless communication device is streaming media, examples of which include: music, video, or other data. The media streaming session is initiated via the LTE communication network. Due to congestion or other factors, wireless communication device is transitioned to the EVDO communication network. The wireless communication device would generate a MIP RRQ identifying the EVDO base station used to access the EVDO communication network. Specifically, the wireless communication device would populate the Base Station Identification (BSID) field in the MIP RRQ.

Figure 4:
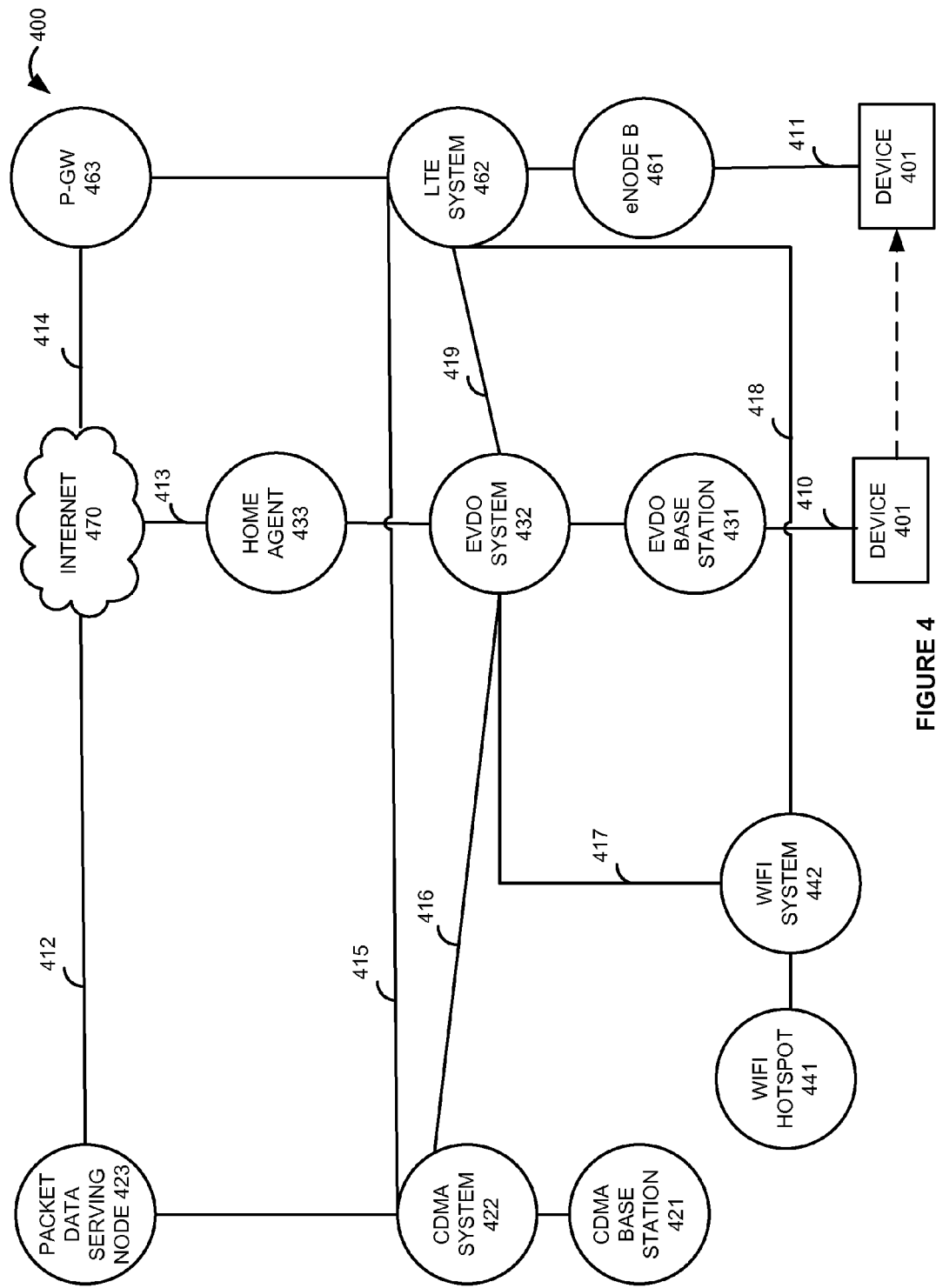
FIG. 4 illustrates an example communication system to identify network access types in MIP RRQs.

FIG. 4 illustrates communication system 400 to identify network access types in MIP RRQs. Communication system 400 is an example of communication system 100, although these systems may use alternative configurations and operations. Communication system 400 comprises wireless communication device 401 (referred to on FIG. 4 as "device 401"); CDMA base station 421, CDMA system 422, and Packet data serving node (PDSN) 423 (referred to herein collectively as "CDMA network"); EVDO base station 431, EVDO system 432, home agent 433 (referred to herein collectively as "EVDO network"); eNode B 461, LTE system 462, P-GW 463 (referred to herein collectively as "LTE network"); WIFI hotspot 441 and WIFI system 442 (referred to herein collectively as "WIFI network"); Internet 470; and communication links 410-419. The communication links connecting components within each individual wireless communication network are shown, but not numbered/labeled for simplicity. Note that EVDO systems that are integrated with LTE systems are referred to as enhanced High Rate Packet Data (eHRPD) systems, but for clarity the term "EVDO" is used herein to refer to both EVDO and eHRPD systems.

Wireless communication device 401 exchanges IP data with Internet 470 via the EVDO network through EVDO base station 431, EVDO system 432, LTE system 462 and P-GW 463. As wireless communication device 401 exchanges IP data with Internet 470 via the EVDO base station 431 and P-GW 463, wireless communication device 401 switches from the EVDO network to the LTE network. After the switch, wireless communication device 401 may access P-GW 463 through eNode B 461 and LTE system 462. Thus, wireless communication device 401 generates and transfers a MIP RRQ identifying eNode B 461. Subsequently, wireless communication device 401 exchanges IP data with Internet 470 via eNode B 461, LTE system 462, and P-GW 463. P-GW 463 has the advantage of knowing the serving wireless network access system (eNode B 461) when it processes the MIP RRQ. Note that the above switch from the EVDO network to the LTE network is exemplary and a similar notification of the access system could be provided in the MIP RRQ on a switch between any of the networks. For example, the MIP RRQ access system notice could be provided on a switch for eNode B 461 to EVDO base station 431, where home agent 431 is the IP network access system.

Figure 5:
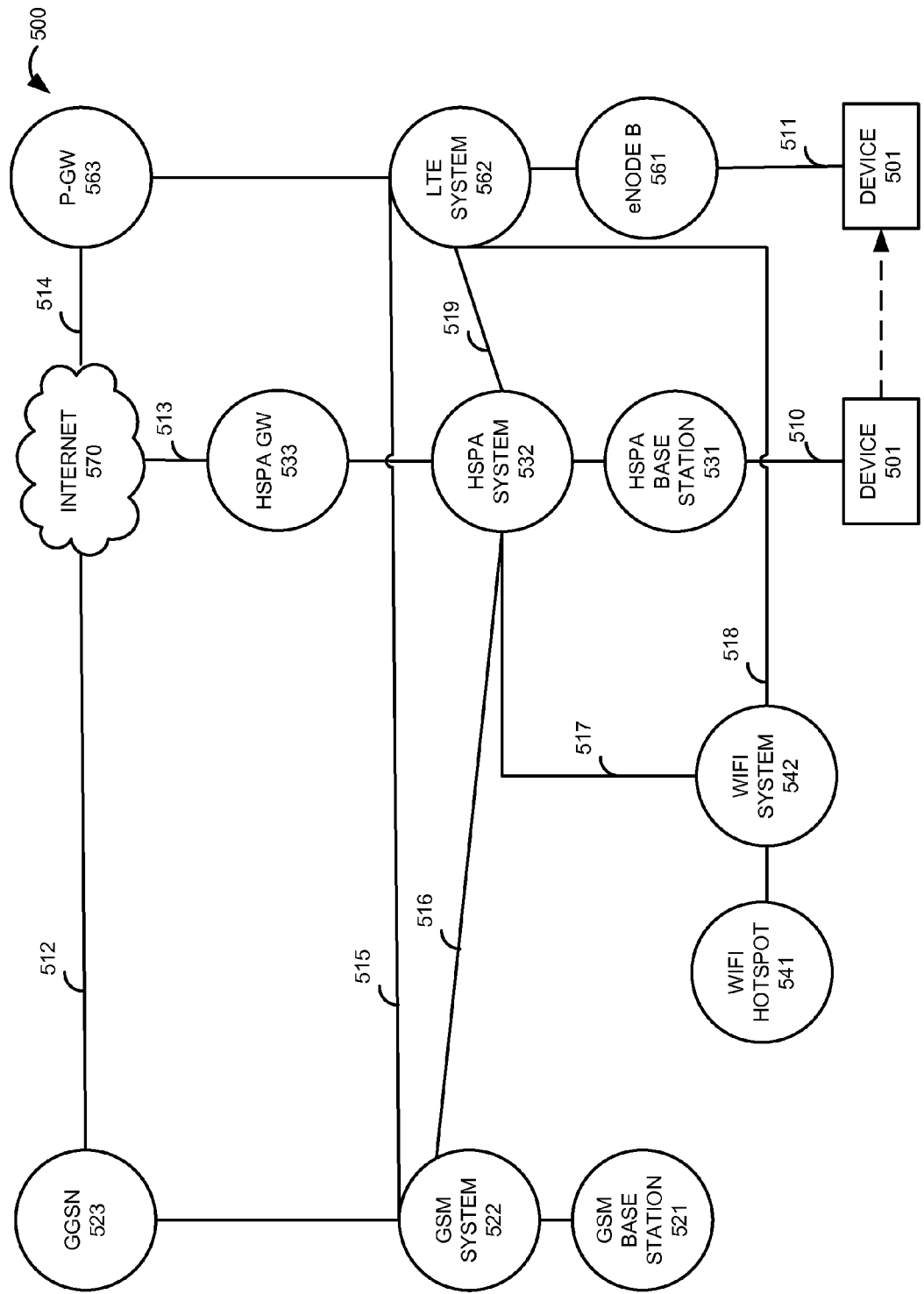
FIG. 5 illustrates an example communication system to identify network access types in MIP RRQs.

FIG. 5 illustrates a communication system 500 to identify network access types in MIP RRQs. Communication system 500 is an example of communication system 100, although these systems may use alternative configurations and operations. Communication system 500 comprises wireless communication device 501 (referred to on FIG. 5 as "device 501"); GSM base station 521, GSM system 522, and GPRS Gateway Support Node (GGSN) 523 (referred to herein collectively as "GSM network"); HSPA base station 531, HSPA system 532, HSPA Gateway 533 (referred to herein collectively as "HSPA network"); eNode B 561, LTE system 562, P-GW 563 (referred to herein collectively as "LTE network"); WIFI hotspot 541 and WIFI system 542 (referred to herein collectively as "WIFI network"); Internet 570; and communication links 510-519. The communication links connecting components within each individual network are shown, but not numbered/labeled for simplicity.

Wireless communication device 501 exchanges IP data with Internet 570 via the HSPA network through HSPA base station 531, HSPA system 532, LTE system 562 and P-GW 563. As wireless communication device 501 exchanges IP data with Internet 570 via the HSPA base station 531 and P-GW 563, wireless communication device 501 switches from the HSPA network to the LTE network. After the switch, wireless communication device 501 may access P-GW 563 through eNode B 561 and LTE system 562. Thus, wireless communication device 501 generates and transfers a MIP RRQ identifying eNode B 561. Subsequently, wireless communication device 501 exchanges IP data with Internet 570 via eNode B 561, LTE system 562, and P-GW 563. P-GW 563 has the advantage of knowing the serving wireless network access system (eNode B 561) when it processes the MIP RRQ. Note that the above switch from the HSPA network to the LTE network is exemplary and a similar notification of the access system could be provided in the MIP RRQ on a switch between any of the networks. For example, the MIP RRQ access system notice could be provided on a switch for WIFI hotspot 541 to HSPA base station 531.

Figure 6:
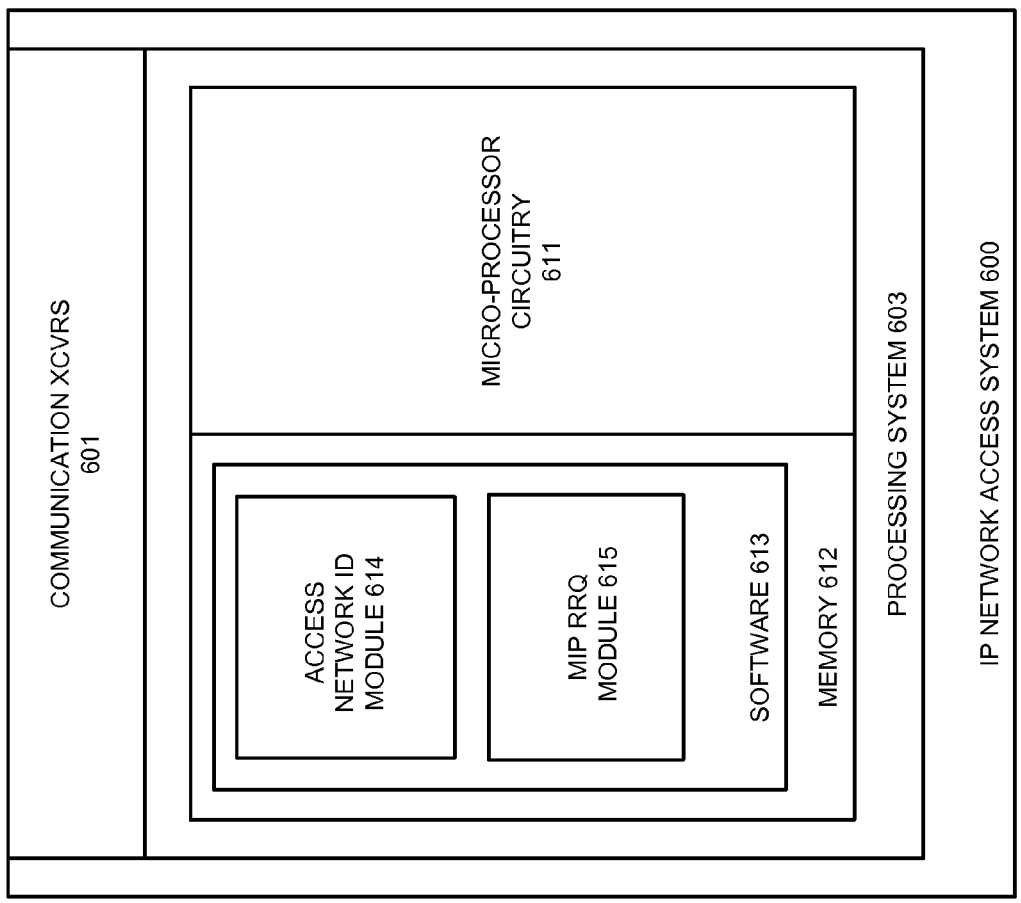
FIG. 6 illustrates an example of the IP network access system shown in FIGS. 1-2 and 4-5.

FIG. 6 illustrates IP network access system 600 to identify network access types in MIP RRQs. IP network access system 600 is an example of IP network access system 131, PDSN 423, Home agent 433, P-GW 463, GGSN 523, HSPA gateway 533, and P-GW 563, although these systems may use alternative configurations and operations. IP network access system 600 comprises communication transceiver 601, processing system 603, circuitry 611, memory 612. Memory stores software 613. Software 613 includes access network identification module 614 and MIP RRQ module 615.

Figure 7:
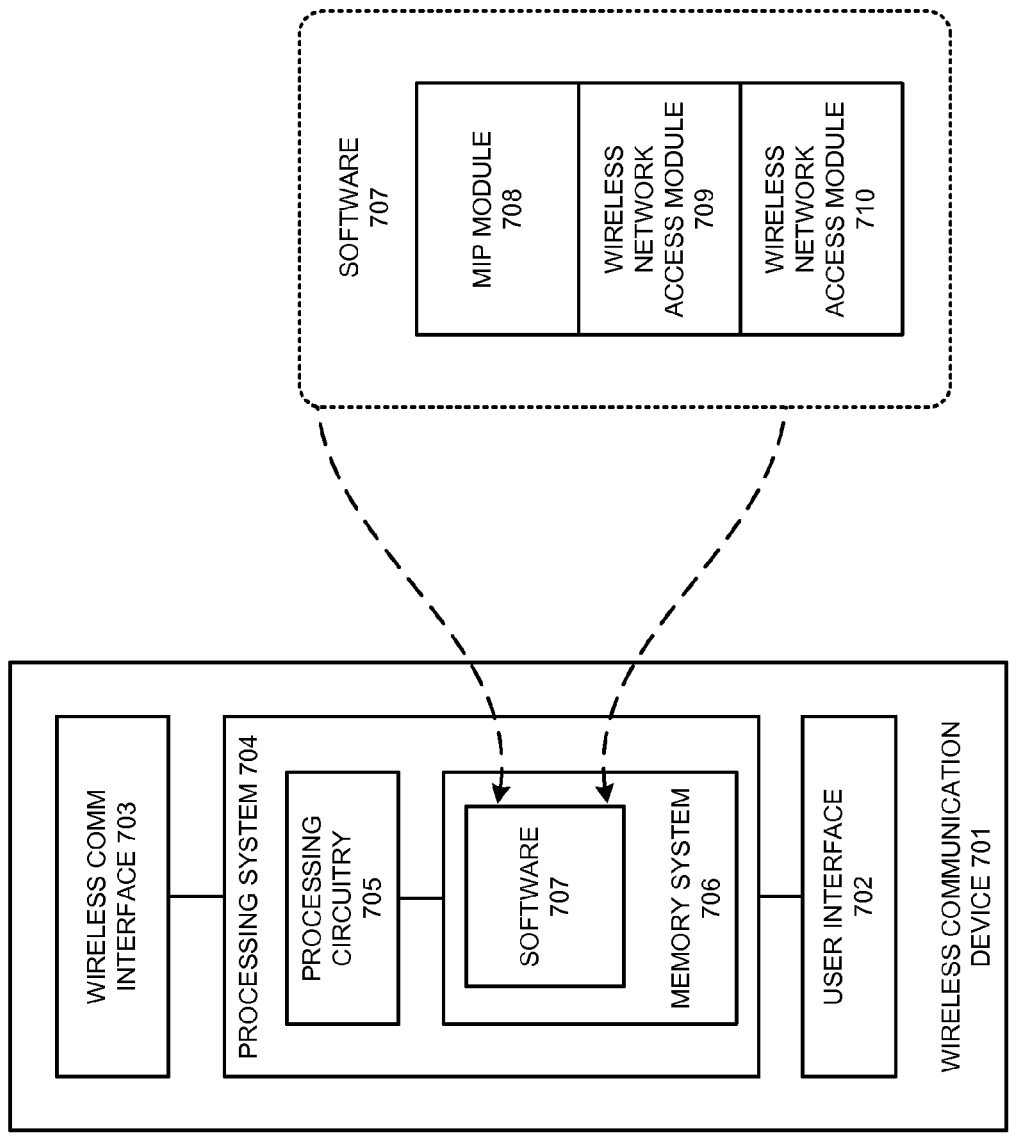
FIG. 7 illustrates an example of the wireless communication device shown in FIGS. 1-2 and 4-5.

FIG. 7 illustrates wireless communication device 701 to identify network access types in MIP RRQs. Wireless communication device 701 provides an example of wireless communication devices 101, 401, and 501, although devices 101, 401, and 501 could use alternative configurations. Wireless communication device 701 comprises and user interface 702, wireless communication interface 703, processing system 704. Processing system 704 is linked to user interface 702 and wireless communication interface 703. Processing system 704 includes processing circuitry 705 and memory system 706 that stores operating software 707. Wireless communication device 701 may include other well-known components such as a battery and enclosure that are not shown for clarity. Wireless communication device 701 may comprise a telephone, mobile phone, smart phone, computer, laptop, e-book, mobile Internet appliance, media player, game console, television, wireless network interface card, or some other wireless communication apparatus—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof.

Wireless communication interface 703 comprises RF communication circuitry and an antenna. The RF communication circuitry typically includes an amplifier, filter, RF modulator, and signal processing circuitry. Wireless communication interface 703 may also include a memory device, software, processing circuitry, or some other communication device. Wireless communication interface 703 may use various protocols, such as CDMA, GSM, HSPA, EVDO, LTE, WiMAX, WIFI, Bluetooth, Internet, telephony, or some other wireless communication format. Wireless communication interface 703 may be configured to wirelessly exchange wireless network data with a wireless network access system in a wireless communication network.

Processing circuitry 705 comprises microprocessor and other circuitry that retrieves and executes software 707 from memory system 706. Memory system 706 comprises a disk drive, flash drive, data storage circuitry, or some other memory apparatus. Processing circuitry 705 is typically mounted on a circuit board that may also hold memory system 706 and portions of communication interface 703 and user interface 702.

Software 707 includes MIP module 708, wireless network access module 709, and wireless network access module 710. Software 707 comprises computer programs, firmware, or some other form of machine-readable processing instructions. Software 707 may include an operating system, utilities, drivers, network interfaces, applications, or some other type of software. When executed by processing circuitry 705, software 707 directs processing system 704 to operate wireless communication device 701 as described herein for wireless communication devices 101, 401, and 501.

In particular, MIP module 708 directs processing system 704 to generate a MIP RRQ identifying the wireless network access system. Wireless network access modules 709 and 710 directs wireless communication interface 703 to exchange wireless network data with a wireless network access system. Further wireless network access modules direct wireless communication interface 703 to wirelessly transfer the MIP RRQ for delivery to the IP protocol network access system.

Referring back to FIG. 1B, wireless communication device 101 comprises any device having wireless communication connectivity with hardware and circuitry programmed to function as a telecommunications device, such as Radio Frequency (RF) communication circuitry, an antenna, and software. The RF communication circuitry typically includes an amplifier, filter, modulator, and signal processing circuitry. Wireless communication device 101 may also include a user interface, memory system, processing circuitry, or some other communication components. For example, wireless communication device 101 could include telephones, mobile phones, cellular phones, smartphones, tablets, laptops, personal digital assistants (PDAs), computers, media players, eReaders, game consoles, televisions, mobile Internet devices, machine transceivers, and/or some other apparatus having wireless networking components.

Wireless communication device 101 wirelessly communications with wireless communication environment 120 over communication links 111-112. Wireless network protocols that may be utilized by wireless communication device 101 include CDMA, GSM, HSPA, EVDO, LTE, WiMax, IEEE 802.11 protocols (WIFI), Bluetooth, or some other wireless network protocol.

Wireless communication networks 121 and 125 include wireless network access systems 122-124 and 126-128, respectively. Wireless network access systems 122-124 and 126-128 comprise RF communication circuitry and antenna systems. The RF communication circuitry typically includes amplifiers, filters, RF modulators, and signal processing circuitry. Wireless network protocols that may be utilized by the wireless network access systems include CDMA, GSM, HSPA, EVDO, LTE, WiMax, WIFI, Bluetooth, or some other wireless communication format—including combinations thereof. Wireless network access systems 122-124 and 126-128 also comprise communication circuitry, software, and links that exchange communications between the wireless network access systems and external systems, such as IP network access system 131. Wireless network access systems 122-124 and 126-128 typically include components such as communication links, routers, gateways, servers, data storage systems, and power supplies. Wireless communication networks 121 and 125 communication with IP network access system 131 over communication links 113-118. IP access system 131 communications with IP network 130 over communication link 119.

Wireless communication links 111-112 use air or space as the transport medium. Wireless communication links 111-112 may use various protocols, such as CDMA, GSM, HSPA, EVDO, LET, WiMax, WIFI, Bluetooth, or some other wireless communication format—including combinations thereof. Communication links 113-119 use metal, air, space, glass, plastic, or some other transport material. Communication links 113-119 could use various communication protocols, such as TDM, IP, Ethernet, optical networking, hybrid fiber coax (HFC), communication signaling, wireless protocols, or some other communications format—including combinations thereof. Wireless communication links 113-119 is representative and may include intermediate links, systems, and networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific combination described above, but only by the following claims and their equivalents.

What is claimed is:

1. A method of operating a wireless communication device, the method comprising:
    identifying an eNodeB in a Long Term Evolution (LTE) network;
    exchanging wireless network data with a wireless network access node in a wireless communication network;
    generating a Mobile Internet Protocol (MIP) Registration Request (RRQ) identifying the eNodeB in the LTE network and the wireless access node in the wireless communication network, wherein generating the MIP RRQ identifying the eNodeB comprises generating the MIP RRQ including an LTE Physical Cell Identification (PCI);
    transferring the MIP RRQ to the eNodeB in the LTE network for delivery to an Internet Protocol (IP) network; and
    exchanging IP data with the IP network over the eNodeB.

2. The method of claim 1 wherein generating the MIP RRQ identifying the wireless network access node comprises generating the MIP RRQ including an Evolution Data Optimized (EVDO) Base Station Identification (BSID).

3. The method of claim 1 wherein generating the MIP RRQ identifying the wireless network access node comprises generating the MIP RRQ including a Global System for Mobile Communications (GSM) Base Station Identity Code (BSIC).

4. The method of claim 1 wherein generating the MIP RRQ identifying the wireless network access node comprises generating the MIP RRQ including a Code Division Multiple Access (CDMA) Mobile Switching Center Identification (MSCID).

5. The method of claim 1 wherein generating the MIP RRQ identifying the wireless network access node comprises generating the MIP RRQ including an IEEE 802.11 (WIFI) Basic Service Set Identification (BSSID).

6. The method of claim 1 wherein the Internet Protocol (IP) network comprises a PDN Gateway (P-GW).

7. The method of claim 1 wherein the IP network comprises a Home Agent (HA).

8. The method of claim 1 wherein the IP network comprises a Wireless Access Gateway (WAG).

9. The method of claim 1 wherein generating the MIP RRQ, and transferring the MIP RRQ comprises identifying the eNodeB, in response to a handover from the wireless access node to the eNodeB.

10. A wireless communication device comprising:
    a processing system configured to identify an eNodeB in a Long Term Evolution (LTE) network;
    a wireless communication interface configured to exchange wireless network data with a wireless network access node in a wireless communication network;
    the processing system configured to generate a Mobile Internet Protocol (MIP) Registration Request (RRQ) identifying the eNodeB in the LTE network and the wireless access node in the wireless communication network, wherein the MIP RRQ includes an LTE Physical Cell Identification (PCI);
    the wireless communication interface configured to transfer the MIP RRQ to the eNodeB in the LTE network for delivery to an Internet Protocol (IP) network; and
    the wireless communication interface configured to exchange IP data with the IP network over the eNodeB.

11. The wireless communication device of claim 10 wherein the processing system is configured to generate the MIP RRQ including an Evolution Data Optimized (EVDO) Base Station Identification (BSID).

12. The wireless communication device of claim 10 wherein the processing system is configured to generate the MIP RRQ including a Global System for Mobile Communications (GSM) Base Station Identity Code (BSIC).

13. The wireless communication device of claim 10 wherein the processing system is configured to generate the MIP RRQ including a Code Division Multiple Access (CDMA) Mobile Switching Center Identification (MSCID).

14. The wireless communication device of claim 10 wherein the processing system is configured to generate the MIP RRQ including an IEEE 802.11 (WIFI) Basic Service Set Identification (BSSID).

15. The wireless communication device of claim 10 wherein the Internet Protocol (IP) network comprises a PDN Gateway (P-GW).

16. The wireless communication device of claim 10 wherein the Internet Protocol (IP) network comprises a Home Agent (HA).

17. The wireless communication device of claim 10 wherein the Internet Protocol (IP) network comprises a Wireless Access Gateway (WAG).

18. The wireless communication device of claim 10 wherein the processing system configured to generate the MIP RRQ, and transfer the MIP RRQ comprises identifying the eNodeB, in response to a handover from the wireless access node to the eNodeB.

* * * * *